(12) United States Patent
Hartcher

(10) Patent No.: US 9,731,903 B2
(45) Date of Patent: Aug. 15, 2017

(54) LAUNCH VEHICLE WITH A MULTI-DIP DECK FOR HIGHWALL MINING

(71) Applicant: UGM ADDCAR Systems, LLC, Ashland, KY (US)

(72) Inventor: Paul Hartcher, Merewether (AU)

(73) Assignee: UGM ADDCAR Systems, LLC, Ashland, KY (US)

( * ) Notice: Subject to any disclaimer, the term of this patent is extended or adjusted under 35 U.S.C. 154(b) by 0 days.

(21) Appl. No.: 14/872,324

(22) Filed: Oct. 1, 2015

(65) Prior Publication Data

US 2016/0096688 A1 Apr. 7, 2016

Related U.S. Application Data

(60) Provisional application No. 62/058,345, filed on Oct. 1, 2014.

(51) Int. Cl.
*E21C 35/24* (2006.01)
*E21C 27/24* (2006.01)
(Continued)

(52) U.S. Cl.
CPC .......... *B65G 41/002* (2013.01); *B65G 21/12* (2013.01); *B65G 37/00* (2013.01); *B65G 41/007* (2013.01);
(Continued)

(58) Field of Classification Search
CPC .......... E21C 27/24; E21C 35/24; E21C 41/04; E21C 41/18; E21C 41/28; E21F 13/006; E21F 13/08; E21F 13/083
See application file for complete search history.

(56) References Cited

U.S. PATENT DOCUMENTS

| | | | | |
|---|---|---|---|---|
| 4,014,574 A | * | 3/1977 | Todd | E21C 27/24 |
| | | | | 175/61 |
| 4,160,566 A | * | 7/1979 | McGee | E21C 27/00 |
| | | | | 299/1.05 |

(Continued)

FOREIGN PATENT DOCUMENTS

RU 2515791 5/2014

OTHER PUBLICATIONS

International Search Report and Written Opinion, PCT/US2015/053395 Jan. 20, 2016.

*Primary Examiner* — David Bagnell
*Assistant Examiner* — Michael Goodwin
(74) *Attorney, Agent, or Firm* — James C. Eaves, Jr.; Brian W. Chellgren; Bingham Greenebaum Doll LLP

(57) ABSTRACT

Embodiments of this invention relate to highwall mining, and more particularly to a launch vehicle adapted for use in highwall mining of downward angled seams of mineable material, such as coal. More specifically, the provided launch vehicle includes a lower deck, an upper deck disposed above the lower deck, a launch deck pivotally attached to the upper deck, a first conveyor belt carried on the lower deck and a second conveyor belt carried on the launch deck. A conveyor car is positioned on the launch deck while the launch deck is in a substantially horizontal orientation, then the launch deck is tilted in a vertical place relative to the upper deck to substantially match a dip angle of the seam to be mined. The conveyor car is attached to a conveyor train extending into the seam as the rearmost car in the train. As the conveyor train advances into the seam, the launch deck is returned to a horizontal orientation, an additional conveyor car is added to the launch deck, and the launch deck is again tilted to substantially match the dip (Continued)

angle of the seam to add the additional conveyor car as the new rearmost car in the conveyor train.

26 Claims, 4 Drawing Sheets

(51) Int. Cl.
    *B65G 41/00*     (2006.01)
    *B65G 37/00*     (2006.01)
    *E21C 25/68*     (2006.01)
    *E21C 41/16*     (2006.01)
    *B65G 21/12*     (2006.01)
    *E21C 41/18*     (2006.01)

(52) U.S. Cl.
    CPC .............. *E21C 25/68* (2013.01); *E21C 27/24* (2013.01); *E21C 35/24* (2013.01); *E21C 41/04* (2013.01); *E21C 41/18* (2013.01)

(56) References Cited

U.S. PATENT DOCUMENTS

| | | | | |
|---|---|---|---|---|
| 4,952,000 | A | * | 8/1990 | Lipinski .................. E21C 35/24 299/1.1 |
| 5,261,729 | A | | 11/1993 | Addington et al. |
| 5,609,397 | A | * | 3/1997 | Marshall .................. E21C 25/58 105/3 |
| 5,692,807 | A | * | 12/1997 | Zimmerman ......... E21F 13/083 299/30 |
| 5,967,616 | A | * | 10/1999 | Offutt ..................... E21C 27/24 299/30 |
| 6,652,035 | B2 | | 11/2003 | Chisholm |
| 8,573,705 | B2 | | 11/2013 | Baird et al. |
| 2003/0042784 | A1 | * | 3/2003 | Chisholm ............... E21C 41/26 299/30 |
| 2007/0035171 | A1 | * | 2/2007 | Baird ..................... E21C 27/24 299/18 |
| 2007/0216216 | A1 | | 9/2007 | Baird et al. |
| 2012/0319451 | A1 | | 12/2012 | In'T Hout |
| 2016/0090838 | A1 | * | 3/2016 | Baird, Jr. ................ E21C 41/18 299/18 |

* cited by examiner

LAUNCH VEHICLE WITH A MULTI-DIP DECK FOR HIGHWALL MINING

This application claims the benefit of U.S. provisional patent application Ser. No. 62/058,345, filed Oct. 1, 2014, for LAUNCH VEHICLE WITH A MULTI-DIP DECK FOR HIGHWALL MINING, incorporated herein by reference.

FIELD OF THE INVENTION

Embodiments of this invention relate to highwall mining, and more particularly to a launch vehicle adapted for use in highwall mining of downward angled seams of mineable material, such as coal. More specifically, the provided launch vehicle includes a lower deck, an upper deck disposed above the lower deck, a launch deck pivotally attached to the upper deck, a first conveyor belt carried on the lower deck and a second conveyor belt carried on the launch deck. A conveyor car is positioned on the launch deck while the launch deck is in a substantially horizontal orientation, then the launch deck is tilted upwards relative to the upper deck to substantially match an entry angle of the seam to be mined. The conveyor car is attached to a conveyor train extending into the seam as the rearmost car in the train. As the conveyor train advances into the seam, the launch deck is returned to a substantially horizontal orientation, an additional conveyor car is added to the launch deck, and the launch deck is again tilted to substantially match the entry angle of the seam to add the additional conveyor car as the new rearmost car in the conveyor train.

BACKGROUND

Embodiments of this invention are directed to a highwall mining arrangement in which a plurality of conveyor cars are linked together in series to form a conveyor train led by a mechanical miner. The miner and train of conveyor cars progresses into a seam (e.g., an elongate hole) that is created or mined into a vertical wall of a hillside. The miner loosens and extracts coal, or some other mineable material. The conveyor cars then pass the material along the train and out of the seam where the material may be collected and hauled away.

Highwall mining systems are known to efficiently mine near surface coal from seams with a low excavation cost, high yield, and low level of environmental damage. In highwall mining methods, the surface of the hillside is vertically excavated to the vertical level of the coal seam as is the case with a conventional surface mine. A vehicle, which may be referred to as a "launch vehicle", is placed near or adjacent to the exposed vertical wall of the seam. A mobile mining machine, referred to as a "miner", is launched into the exposed face of the seam. As the miner progresses in loosening and removing the coal from the seam, it forms an elongate hole that may be up to, for example, about eleven and one-half feet in width (as determined by the width of the miner's cutter drum) and up to about sixteen feet in height (as determined by the height of the layer of coal or other material being mined). Using a miner of this size, it is possible to mine seams of up to twenty-eight feet in height when the mining is performed separately for an upper section and a lower section of the seam. Smaller miners may be used with smaller seams of mineable material. In some embodiments, the hole may extend to over 2000 feet in length.

The miner used in highwall mining may be the same as is used in traditional underground coal mines. The miner may include a cutter apparatus which moves up and down the face of the coal seam, loosening and extracting coal in a perpendicular direction away from the face. The conveyor cars carry the extracted coal from the miner to the launch vehicle. Propulsion cylinders in the launch vehicle may guide the mining apparatus into the coal seam. These propulsion cylinders may also withdraw the mining apparatus out of the seam after the mining of the coal has been completed. As the mining arrangement advances into the seam, conveyor cars are sequentially added to the back of the train. These conveyor cars transfer the coal back from the miner to the launch vehicle on conveyor belts. From the launch vehicle, the coal may be collected and carried away by dump trucks for off-site processing.

One advantage of highwall mining is that there is no need for people to enter the coal seam, which may be a hazardous environment, as is well known. Because no people are physically at risk, the mining operation may be conducted without any roof support. One or more cameras in the area of the miner may be used to produce video images of the mining operation, and these video images may be viewed in real time by the operator of the launch vehicle. One or more cables or chains may extend from the launch vehicle to the conveyor cars and the miner while the miner is in operation. These cables or chains may be used to assist in advancing the train into the seam, or pulling the train out of the seam, as required.

A problem is that none of the currently available highwall mining systems are efficient and practical in mining seams having relatively steep slopes, e.g., slopes over about 15 degrees. The existing prior art systems are also, in general, relatively cumbersome to move from one location to another. Often, relocation requires substantial dismantling of these complex systems over a time span of several days. U.S. Pat. No. 6,652,035 to Chisholm discloses the use of hydraulic cylinders for tilting and changing the elevation of an entire launch vehicle to substantially match a dip angle. Accordingly, the coal conveyor belt of the launch vehicle carries the coal at an upward angle away from the seam, allowing the force of gravity to cause some of the coal to fall backward on the conveyor belt or fall off of the conveyor belt. Moreover, when conveyor cars are loaded onto and unloaded from the launch vehicle, a front end loader must awkwardly hold the conveyor cars at the same angle at which the launch vehicle is oriented (e.g., at the dip angle). In addition to the difficulty this presents to the operator of the front end loader, there is also the risk that the conveyor car may flip over off of the front end loader when supported at such a steep angle.

In view of the known methods described above, there is a need for a highwall mining system capable of efficient and practical operation in steep dip seams, e.g., seams oriented at angles of over about 15 degrees relative to the horizontal direction.

SUMMARY

Embodiments of this invention are directed to a highwall mining system including a launch deck that may be pivoted from a substantially horizontal orientation such that the conveyor train may be aligned with the entry angle of the seam in which the conveyor train is inserted. The launch deck is pivotally attached to a substantially horizontal upper deck disposed above a lower deck. The lower deck supports the miner and one conveyor car in move mode. In mine mode, the lower, horizontal deck may launch the miner and the first conveyor car, and the launch deck may launch all subsequent conveyor cars.

The invention comprises, in one embodiment thereof, a launch vehicle for a highwall mining system, including a substantially horizontally oriented lower deck, a launch deck disposed above the lower deck, a deck lift assembly configured to effect controlled lifting and lowering of the launch deck, wherein the lower deck remains substantially horizontally oriented during the tilting of the launch deck by the deck lift assembly.

The invention comprises, in another embodiment thereof, a method of highwall mining a steep dip seam, including the steps of providing an elongated launch vehicle having a lower deck, a launch deck disposed above the lower deck, a first conveyor belt carried on the lower deck and a second conveyor belt carried on the launch deck, aligning the launch vehicle with a planned location of a seam to be mined, placing a conveyor car on the launch deck while the launch deck is in a substantially horizontal orientation, tilting the launch deck upward relative to the lower deck to substantially match an entry angle of the seam, connecting the conveyor car to a conveyor train extending into the seam, the conveyor train including a miner and at least one train conveyor car, using the miner to cut material from the seam being mined, and moving the cut material to rearmost conveyor car by use of the conveyor train, moving the cut material to the second conveyor belt by use of the conveyor car, and moving the cut material to the first conveyor belt by use of the second conveyor belt.

The invention comprises, in a further embodiments thereof, a highwall mining system particularly suitable for steep dip seams and of the type wherein multiple conveyor cars are connected together to form a conveyor train which extends into a seam being mined, including an elongated launch vehicle including a substantially horizontally oriented lower deck including an electric power control cab configured to control power to and operation of the highwall mining system, a substantially horizontally oriented upper deck supported above the lower deck by at least one support column, a launch deck for receiving and supporting a conveyor car which is to be added to or removed from an outer end of the conveyor train when in mining operation, wherein the launch deck is supported above the lower deck and pivotally coupled to the upper deck, a first conveyor belt supported by the lower deck, a second conveyor belt supported by the launch deck that extends substantially parallel to the launch deck, the second conveyor belt configured to move mined material to the first conveyor belt, and a deck lift assembly including at least one extendable elongated hydraulic cylinder secured to the launch deck at one end and secured to the upper deck at an opposite end, the hydraulic cylinder configured to effect controlled lifting and lowering of the launch deck and to tilt the launch deck upward relative to the upper deck as desired to substantially match a dip angle of the seam to be mined during mining operation, and to return the launch deck to a substantially horizontal orientation when not in mining operation, and a plurality of conveyor cars forming the conveyor train and adapted to convey mined material outwardly to the second conveyor belt, and a miner attached to an inner end of the conveyor train for cutting material from the seam being mined and moving the material to the inner end of the conveyor train for conveyance by the conveyor train outwardly to the second conveyor belt.

An advantage of the present invention is that the launch deck may be placed in a horizontal orientation when conveyor cars are being added or removed. Thus, the addition and removal of conveyor cars is less cumbersome for the operator of the front loader which carries the conveyor cars, and the risk of the conveyor cars flipping over is minimized.

Another advantage is that the first conveyor belt may carry the coal or other material being mined in a horizontal direction despite the launch deck being pivoted to match the entry angle of the seam.

Another advantage is that the launch deck may be placed in a tilted orientation substantially aligned with the entry angle of the seam to facilitate the entry of conveyor cars into the seam.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1A:
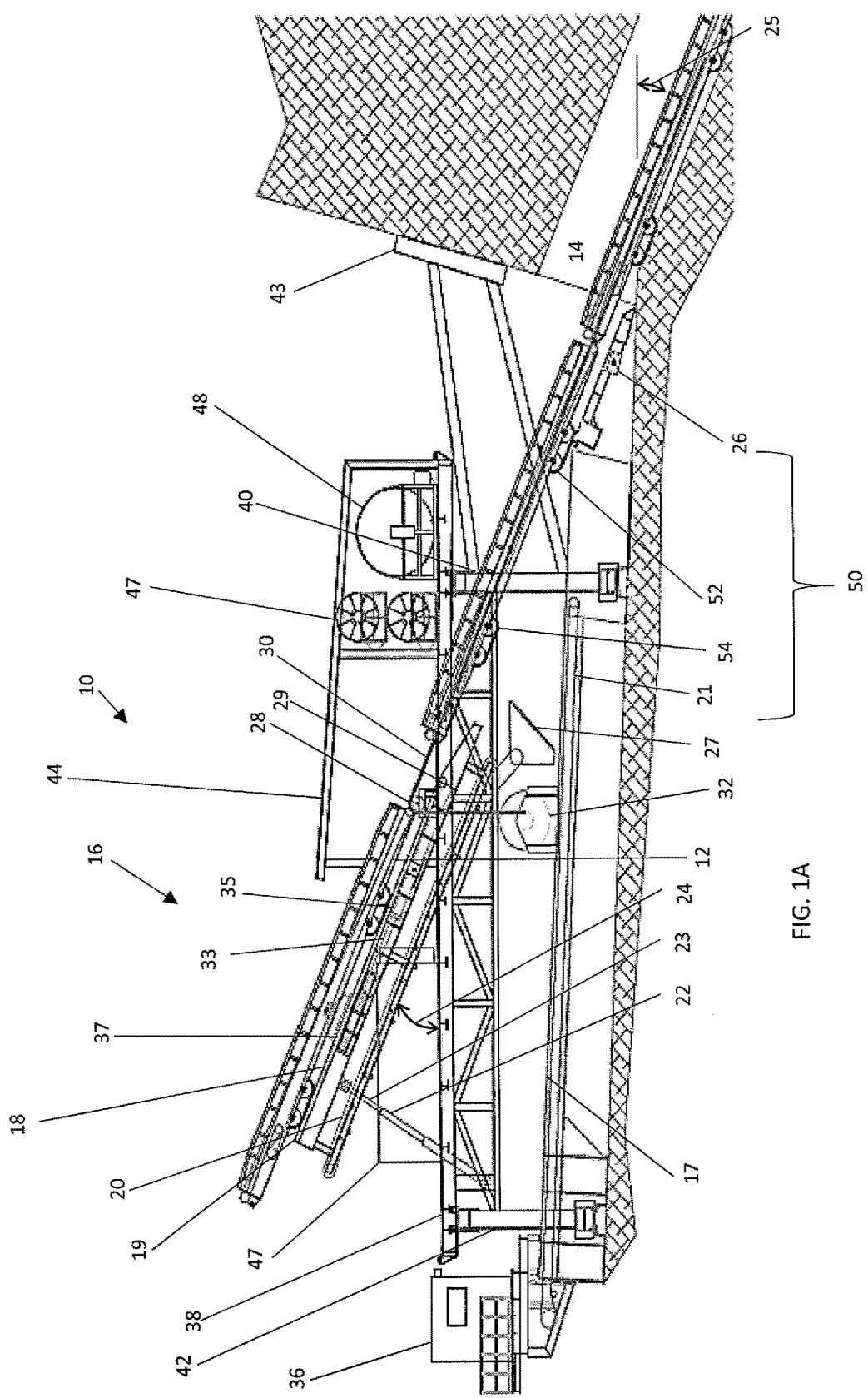
FIG. 1A is a schematic side view of one embodiment of highwall mining system of the present invention in mine mode.
Figure 1B:
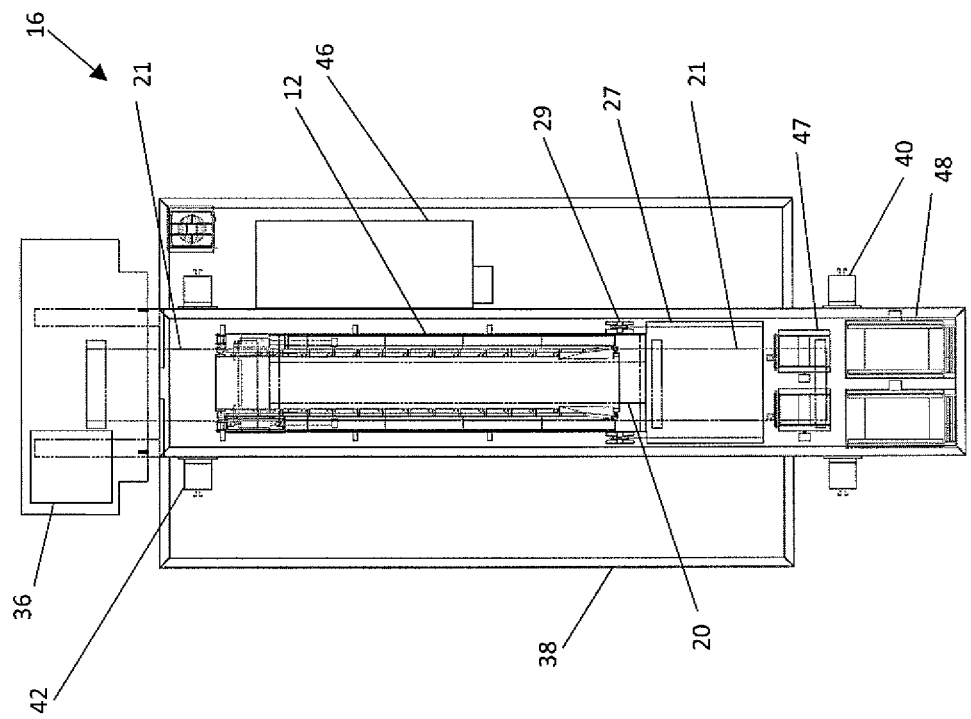
FIG. 1B is a schematic top view of the highwall mining system of FIG. 1A, with the canopy, chains and wall footing plate omitted for clarity, and a single conveyor car positioned on the launch deck.
Figure 1C:
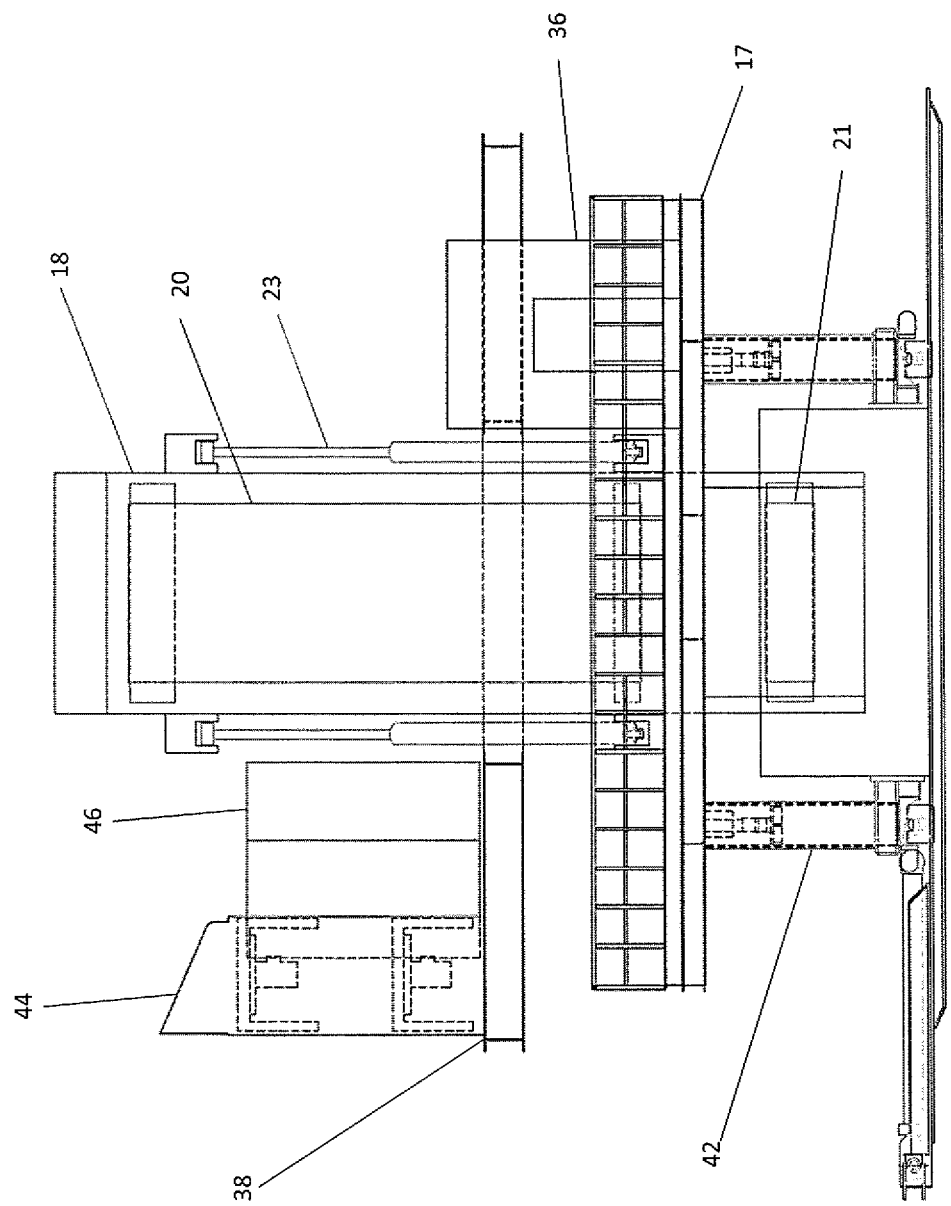
FIG. 1C is a schematic rear view of the highwall mining system of FIG. 1A.

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document herein is a reference to an embodiment of a family of inventions, with no single embodiment including features that are necessarily included in all embodiments, unless otherwise stated. Further, although there may be references to "advantages" provided by some embodiments of the present invention, it is understood that other embodiments may not include those same advantages, or may include different advantages. Any advantages described herein are not to be construed as limiting to any of the claims.

Specific quantities (spatial dimensions, angles, dimensionless parameters, etc.) may be used explicitly or implicitly herein, such specific quantities are presented as examples and are approximate values unless otherwise indicated. Discussions pertaining to specific compositions of matter are presented as examples and do not limit the applicability of other compositions of matter, especially other compositions of matter with similar properties, unless otherwise indicated.

Referring now to the drawings, and particularly to FIG. 1A, there is shown one embodiment of a highwall mining system 10 of the invention in a mining mode of operation. Highwall mining system 10 may be particularly suited for operations with mineable mineral seams, such as coal seams, having a steep dip angle. Mining system 10 includes a train of conveyor cars 12 extending into a seam 14 of coal or other material being mined. System 10 further includes an elongate launch vehicle 16 having a launch deck or "tilt deck" 18 pivotally attached to an upper deck 38, the upper deck 38 supported above a lower deck 17. The upper deck 38 and lower deck 17 are positioned in a substantially horizontal orientation, defined herein as less than about 5 degrees from horizontal. Launch deck 18 is configured for receiving and supporting a conveyor car 12 when in a substantially horizontal orientation, as depicted in FIG. 2.

The launch deck 18 carries and supports a second conveyor belt 20 to receive coal which has been transported along the conveyor train. The second conveyor belt 20 remains substantially parallel to the launch deck 18 as the launch deck pivots with respect to the upper deck 38. Second conveyor belt 20 may convey and discharge the coal to a first conveyor belt 21 or "belly belt" carried on and supported by the lower deck 17. Second belt 20 may convey the coal to first conveyor belt 21 via a feed chute 27. In the depicted embodiment, the feed chute 27 is positioned at the front end of the second conveyor belt 20, such that coal is conveyed forward along the second conveyor belt 20, then falls downward through the feed chute 27 and onto the first conveyor belt 21. First conveyor belt 21 is typically parallel to the lower deck 17 and, in some embodiments, is angled 2 degrees to 5 degrees from horizontal to raise mined material as it is moved from the front to rear of the launch vehicle 16. A discharge conveyor or stacking conveyor (not shown) may carry the coal away from the rear of first conveyor belt 21 and may move the coal into containers or alternatively simply form a pile of the coal on the ground. In some embodiments, first conveyor belt 21 extends up to or substantially the full length of launch vehicle 16 and may be trained about and supported on drive and idler rollers (not shown) in a conventional manner. Conveyor belts 20, 21 may be textured with spaced-apart raised projections on their outer surface. These projections may provide increased friction in engaging the aggregate coal so that the coal may be efficiently carried along with the moving belts 20, 21.

Figure 2:
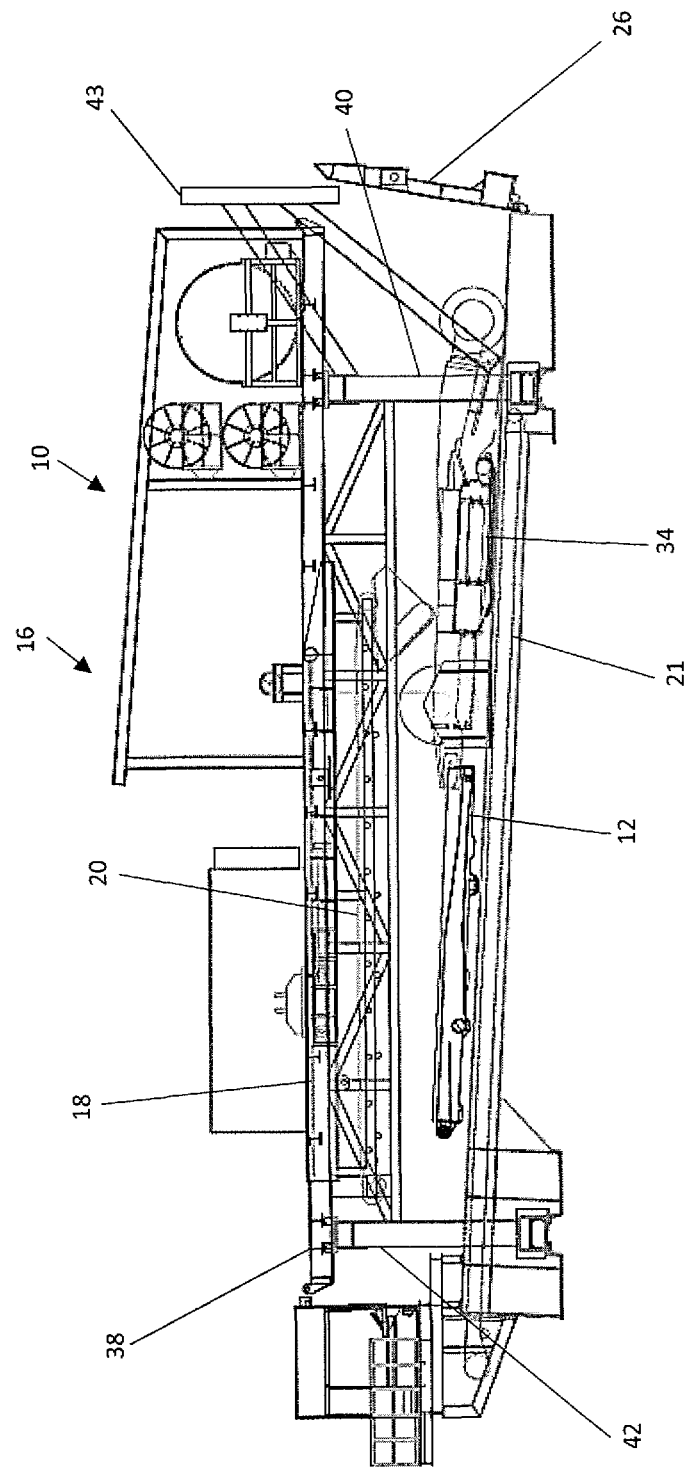
FIG. 2 is a schematic side view of the highwall mining system of FIG. 1A in move mode, with a conveyor car and a miner positioned on the lower deck.

As is evident from a comparison of FIGS. 1A and 2, launch deck 18 is pivotable relative to the upper deck 38 between a substantially horizontal orientation illustrated in the "move mode" of the launch vehicle 16 depicted FIG. 2 and a tilted orientation illustrated in the "mine mode" of the launch vehicle 16 depicted in FIG. 1A. More particularly, a deck lift assembly 22 may lift the rear end 19 of launch deck 18, causing the launch deck 18 to rotate about a pivot point 29. The pivot point 29 is located between the midpoint of the launch deck 18 and the front end of the launch deck 18. In some embodiments, the pivot point 29 is located at a position along the length of the launch deck 18 closer to the front end of the launch deck 18 than to the midpoint of the launch deck 18. In further embodiments, the pivot point 29 is located at or adjacent to the front end of the launch deck 18. In some embodiments, the deck lift assembly 22 comprises at least one elongated hydraulic cylinder 23 secured to the launch deck 18 at one end and secured to the upper deck 38 at an opposite end. In the embodiment depicted in FIGS. 1A-1C and 2, the deck lift assembly 22 comprises two elongated hydraulic cylinders 23 positioned beneath the launch deck 18. In other embodiments, the deck lift assembly 22 may be a winch hoist coupled to cables, a rack and pinion mechanism, a rotary actuator or other operable mechanism. The cylinders 23 may perform controlled lifting and lowering of the rear end 19 of launch deck 18 and may pivot launch deck 18 to a dip angle 24 which substantially matches the entry angle 25 of seam 14. Cylinders 23 may be obscured by second conveyor belt 20 in FIG. 2 and thus are not plainly visible in FIG. 2. However, it is to be understood that, in FIG. 2, cylinders 23 may remain inclined slightly upward from a horizontal orientation such that longitudinal expansion of cylinders 23 causes cylinders 23 to pivot from the near-horizontal orientation to the orientation shown in FIG. 1A. In some embodiments, dip angle 24 may be greater than 5 degrees, greater than 15 degrees or greater than 30 degrees. In the embodiment illustrated, launch deck 18 is pivoted to a dip angle 24 that substantially matches the steep dip angle of seam 14. A ramp 26 may provide a continuous transition from the front end of lower deck 17 to the mouth of seam 14. In some embodiments, the ramp 26 is pivotally coupled to the first or front end of the lower deck 17.

A windlass 28 may be employed in conjunction with metal chains 30 to support the weight of the train of conveyor cars 12 and prevent the weight of the train from pushing the train farther into seam 14 than is desired. Chains 30 may be securely attached to both of the opposite lateral sides of each conveyor car 12 and to both of the opposite lateral sides of a miner 34. Thus, chains 30 may be used to pull the train out of seam 14. In other embodiments, chains 30 may be attached to fewer than all of the conveyor cars 12. The lower ends of chains 30 may be attached to a winch 32. Alternatively, chains 30 may be replaced by wire ropes or cables (not shown), which may be stored on a winder (not shown). For example, two cables each about 2.5 inches thick may support a train weighing about 600 tons on a 30 degree incline. In some embodiments, as shown in the drawings, the windlass 28 is attached to the upper deck 38, and chains 30 extend from the windlass 28 and releasably couple to the train of conveyor cars 12.

Conveyor cars 12 may be mechanically and electrically interconnected end-to-end, and this train of conveyor cars 12 may extend during use from a miner 34 disposed at the inner end or front end of the train. The train of conveyor cars 12 may extend rearwardly and outwardly to a last conveyor car 12 positioned on launch deck 18. Each conveyor car 12 may have its own powered longitudinally extending slightly inclined conveyor belt (not shown). Each of the conveyor belts operates so as to convey the coal received at the low front end to the high rear end where the coal is discharged from the conveyor car 12. The belts of the conveyor cars 12 in the conveyor train may be adjacent to and/or overlapped with each other at the adjoining ends of the conveyor cars 12 such that the mined coal may be conveyed in an uninterrupted manner from one conveyor car 12 to the next until the coal is deposited onto the first conveyor belt 21. At times when the rearmost conveyor car 12 is located at least partially on the launch deck 18, the coal is deposited from the rearmost conveyor car 12 onto the second conveyor belt 20, then onto the first conveyor belt 21 via the chute 27.

A conveyor car control system 35 may be used to assist in advancing and retracting conveyor cars, groups of conveyor cars, or the entire conveyor train. In the embodiment depicted in the drawings, the conveyor car control system 35 is a pair of elongated hydraulic conveyor car drive cylinders 33 mounted to launch deck 18 at opposing sides thereof and may flank the last or outermost conveyor car 12 on launch deck 18. These conveyor car drive cylinders 33 may each include a ram or hold back bar having an actuatable conveyor car engaging device 37 mounted to the distal end thereof. In forward operation, when the conveyor car engaging devices 37 are actuated to connect to the last conveyor car 12, and the drive cylinders 33 are actuated, they may hold back the train of conveyor cars such that the force of gravity advances the train into seam 14 in a controlled manner. In reverse operation, the conveyor car engaging devices 37 and the drive cylinders 33 may pull or retract the train of cars out of seam 14. In one embodiment, the hold back bar is in the form of a push/pull plate (although it is to be understood that the train is not pushed down the steep incline) that may advance the conveyor train in either direction.

As shown in FIG. 2, miner 34 may be attached at the inner end or front end of the conveyor train and may include a rotating cutter head drum for supporting a number of cutting bits. The cutter head drum may be rotatably mounted on arms that are pivotally mounted to the main frame of miner 34. The main frame of miner 34 may be supported for movement along the floor of seam 14 by a pair of skids. In operation, miner 34 may be advanced into coal seam 14, and the cutter head drum may be rotated by a motor. As miner 34 advances into seam 14, the arms may be pivoted thus causing the rotating cutter head to be raised and lowered. Accordingly, coal is cut from the face of seam 14 by the cutting bits. The removed coal may then be delivered by the miner to the lead or front conveyor car 12 of the conveyor train to convey the coal outwardly along the train as described above.

Miner 34 may include one or more video cameras (not shown) to enable the operator in an electric power control cabin 36 to view the operation of miner 34 via video monitors and control the power to and operation of the launch vehicle 16 and miner 34 via operator's controls (not shown). Cabin 36 may be mounted to launch vehicle 16 such that cabin 36 remains level regardless of the entry angle 25 of seam 14 and the dip angle 24 to which launch deck 18 has been pivoted.

Each conveyor car 12 may include its own drum motor (not shown) for driving the car's conveyor belt. All of the conveyor cars 12 may be connected together electrically such that power from a power source located in the launch vehicle 16 may be supplied to the drum motors of all of the individual conveyor cars 12 for simultaneous operation at a substantially equal speed and/or constant speed.

The conveyor belts on cars 12 may be textured with spaced-apart raised projections on their outer surfaces. These projections may provide increased friction in engaging the aggregate coal so that the coal may be efficiently carried along even with a dip angle 24 of up to thirty degrees.

Each conveyor car 12 also includes coupling devices (not shown) at its opposite ends which securely and substantially rigidly couple conveyor cars 12 together and the lead conveyor car to miner 34. These coupling devices connect the conveyor cars together with enough rigidity to enable the conveyor train to be pushed forwardly into seam 14 while at the same time preventing substantial deviation of the conveyor train in directions perpendicular to the straight-line path defined by seam 14. However, a small amount of angular movement of one conveyor car relative to another in a vertical plane is enabled and may be desirable. When conveyor cars 12 are connected together by the coupling devices, conveyor cars 12 may remain in a relatively straight line behind miner 34 during operation. This may be particularly advantageous because, as an example, up to forty-one conveyor cars 12 of forty feet in length may be connected together to reach into a seam 14 that is about 1640 feet long. Nevertheless, a small degree of angular freedom of motion between adjacent conveyor cars is permitted to enable the conveyor train to follow slight contours in seam 14.

Upper deck 38 is supported by front extendible support columns 40 and rear extendible support columns 42, each having a pair of hollow telescoping sections which enable the lengths of columns 40, 42 to be adjustable. In some embodiments, the upper deck 38 is lowered by retracting the columns 40, 42, reducing the total height of the launch vehicle 16 to avoid contacting overhead wires or other obstacles while moving the launch vehicle 16. The upper deck 38 is raised by extending the columns 40, 42 when the launch vehicle 16 is positioned for mining. As shown in FIG. 2, the upper deck 38 is generally U-shaped when viewed from above, with the launch deck 18 passing between the "arms" of the U-shape when tilted upwards.

As shown in FIG. 1A, there may be a gap 50 between launch deck 18 and ramp 26 in which there is be no support underneath a conveyor car 12. As shown, the length of this gap 50 may exceed a distance between frontmost wheels 52 and rearmost wheels 54 of the conveyor car 12. Within the gap 50, conveyor car 12 may be supported by chains 30 coupled to windlass 28, by the conveyor car's connections to the adjacent conveyor cars 12 to the front and to the rear of the conveyor car 12 within gap 50, or by a combination of the two. In other embodiments, the conveyor car 12 may be supported within the gap by an overhead hoist or other operable mechanism. As shown in FIG. 1A, the conveyor car 12 is supported within the gap at an angle substantially equal to the dip angle 24 and the entry angle 25.

In some embodiments, a wall footing plate 43 may be braced against the face of the hillside in order to stabilize launch vehicle 16. Wall footing plate 43 may be rigidly attached to front column 40, as shown in FIG. 1A, or other component of the launch vehicle 16. The launch vehicle upper deck 38 may include a canopy 44 and an electronic power center 46 which may contain the relatively heavy equipment that provides miner 34 and conveyor cars 12 with electrical power and other supplies. This heavy equipment may include various transformers, electrical controls, safety equipment, control and water reels 47, and trailing cable reels 48. In some embodiments, the electric power center 46 provides electrical power to the miner 34, which is electrically connected in series to the following conveyor cars 12.

When used with relatively long conveyor trains, electrical power may be provided to the miner 34, and, for example, to every $10^{th}$, $15^{th}$, or $20^{th}$ following conveyor car 12, with each directly powered miner 34 or conveyor car 12 being in electrical connection with following conveyor cars 12 in series.

An advantage of highwall mining system 10 is that it can relatively easily be moved laterally (e.g., in directions into and out of the page of FIGS. 1A and 2, and directions left and right on the page of FIGS. 1B and 1C) to an adjacent seam to be mined, which may be typically about twenty to forty feet away. With launch deck 18 in the horizontal position of the move mode (as shown in FIG. 2) the entire launch vehicle 16 may be hydraulically slid on skids in a lateral direction. In some embodiments, the miner 34 and first conveyor car 12 are supported on the lower deck 17 during movement instead of the launch deck 18 to lower the center of gravity of the mining system 10.

Tables 1, 2, and 3 below list various types of hardware systems that may be employed in conjunction with highwall mining system 10 of the present invention. More specifically, Table 1 lists four options for anchor points of metal cables or chains or cables 30 on constituents of the conveyor train. Table 2 lists six types of systems or methods for providing traction on conveyor cars 12. Table 3 lists eight types of conveyance systems for moving mined material which can be mounted on the conveyor cars 12.

TABLE 1

| ANCHOR POINTS FOR CABLES OR CHAINS | |
|---|---|
| A1 | ANCHOR TO CONTINUOUS MINER |
| A2 | ANCHOR TO STEERING UNIT |
| A3 | ANCHOR TO FIRST CAR |
| A4 | ANCHOR TO EVERY CAR |

TABLE 2

| TRACTION ON CARS | |
|---|---|
| T1 | TRACK DRIVE ON EVERY CAR |
| T2 | TRACK DRIVE ON MULTIPLE, BUT NOT ALL, CARS |
| T3 | TRACK DRIVE ON A SPECIAL TRACTION CAR |
| T4 | NO TRACTION WITH WHEELS |
| T5 | NO TRACTION WITH TRACK BELTS |
| T6 | NO TRACTION WITH SKIDS (RUNNERS) |

TABLE 3

| CONVEYANCE ON CARS | |
|---|---|
| C1 | CASCADING BELT CARS, SMOOTH BELT |
| C2 | CASCADING BELT CARS, CLEATED BELT |
| C3 | CASCADING BELT CARS WITH SANDWICH BELT |
| C4 | CASCADING CHAIN CARS |
| C5 | AUGER BOX CARS, DUAL AUGERS, LAUNCH DRIVEN |
| C6 | AUGER BOX CARS, QUAD AUGERS, LAUNCH DRIVEN |
| C7 | AUGER BOX CARS, DUAL AUGERS, DRIVEN EACH CAR |

TABLE 3-continued

| CONVEYANCE ON CARS | |
|---|---|
| C8 | AUGER BOX CARS, QUAD AUGERS, DRIVEN EACH CAR |

An "anchor point" may generally refer to the point at which the cable or chain 30 is attached to the conveyor cars 12. The cable or chain 30 may be attached to or "anchored" to the outmost conveyor car in the train, or may be attached to each car in the train in order to spread out the force on the chain/cable between multiple anchor points.

A steering unit may be used for changing the angle, in a plane parallel to the floor of the seam, between the miner 34 and the linear train of conveyor cars 12. For example, the miner 34 and the innermost conveyor car 12 may be pivotably coupled to each other by a vertical or upright pin therebetween. More force or tension may be applied to the cable or chain 30 on one side or the other of the conveyor cars 12 in order to exert more pulling force on one side of the miner 34 and thereby turn the miner 34 one way or the other. For example, if more tension or force is applied to the cable or chain 30 on the left side of the conveyor cars 12, then the miner 34 may be turned to the left, and vice versa. Another example of a suitable steering unit is disclosed in U.S. Pat. No. 8,573,705. An inertial navigation system on the miner may provide feedback in the form of the instantaneous heading direction of the miner. Radiation detectors, as known in the art, may be used to locate the edges of a seam of coal or other mineable material.

The "Sandwich Belt" in Table 3 refers to an arrangement in which the coal or other mined material is sandwiched between two conveyor belts on a conveyor car, one belt positioned above the material and the other belt positioned below the material. This arrangement may facilitate conveying the material up a steep incline.

Table 4 below lists types of conveyor car control systems 35 that may be employed in conjunction with highwall mining system 10 of the present invention, along with the types of hardware systems from Tables 1-3 which may be employed with each of these types of conveyor car control systems. For example, the first type of conveyor car control system listed in Table 4 is "drive cylinders", also known in the industry as "propulsion jacks," which is the control system shown in the drawings. As indicated in the right-hand column of Table 4, no anchor points are used with a drive cylinders-type of conveyor car control system. As also indicated, all six types of traction systems listed in Table 2 may be used with a drive cylinders-type of conveyor car control system 35. As further indicated, all eight types of conveyance systems listed in Table 3 may be used with a drive cylinders-type of conveyor car control system 35.

TABLE 4

| CONVEYOR CAR CONTROL SYSTEMS | |
|---|---|
| Control Systems | Options from Tables 1-3 |
| DRIVE CYLINDERS aka PROPULSION JACKS | |
| DRIVE CYLINDERS | |
| ANCHOR POINTS | N/A |
| TRACTION ON CARS | ALL OPTIONS; T1-T6 |
| CONVEYANCE ON CARS | ALL OPTIONS; C1-C8 |
| WINCHES OR WINDLASS WITH WIRE ROPE OR CHAIN | |

TABLE 4-continued

CONVEYOR CAR CONTROL SYSTEMS

| Control Systems | Options from Tables 1-3 |
|---|---|
| ANCHOR POINTS | ALL OPTIONS; A1-A4 |
| TRACTION ON CARS | ALL OPTIONS; T1-T6 |
| CONVEYANCE ON CARS | ALL OPTIONS; C1-C8 |
| STRAND JACKS WITH SINGLE OR MULTIPLE STRANDS | |
| ANCHOR POINTS | ALL OPTIONS; A1-A4 |
| TRACTION ON CARS | ALL OPTIONS; T1-T6 |
| CONVEYANCE ON CARS | ALL OPTIONS; C1-C8 |
| PUSH/PULL CARRIAGE ON LAUNCH WITH HYDRAULIC DRIVEN CABLE LOOP VEHICLE | |
| ANCHOR POINTS | N/A |
| TRACTION ON CARS | ALL OPTIONS; T1-T6 |
| CONVEYANCE ON CARS | ALL OPTIONS; C1-C8 |

During set up, launch vehicle 16 may be moved into alignment with the planned seam to be mined. As shown in FIG. 2, miner 34 and a first conveyor car 12 may be launched from the horizontal orientation of lower deck 17. After miner 34 and the first conveyor car 12 have created seam 14 and are at least partially inserted into seam 14, subsequent conveyor cars 12 to be added to the end of the train of cars may be launched from launch deck 18. More particularly, a conveyor car 12 to be added to the train may be placed on launch deck 18 by a front end loader (not shown) while the launch deck 18 is in a substantially horizontal orientation. The at least one hydraulic cylinder 23 may then extend to pivot launch deck 18 as required to align launch deck 18 with the seam 14 to be mined. Simultaneously with the pivoting of launch deck 18, windlass 28 may be lifted along with launch deck 18, and winch 32 may be operated to thereby enable chains 30 to support the back end of the conveyor car 12 that is already partially inserted into seam, as shown in FIG. 1A. Thus, the partially inserted conveyor car 12 may also be pivoted and aligned with the seam 14 to be mined. The planned dip angle 24 may be based upon surface drilling samples which indicate the entry angle 25 at which the vein of coal is oriented within the ground. The vein may be only about ten feet thick, so miner 34 could easily diverge from the vein if an inaccurate dip angle 24 is selected. Accordingly, the planned dip angle 24 may be selected such that miner 34 may remove as much of the desired material (e.g., coal) from seam 14 as possible. Various electrical power and control cables (not shown) are connected to miner 34 and to the lead conveyor car and, under remote control of the operator with the aid of video monitors on the miner, the mining operation begins.

During use, miner 34 and the lead conveyor car are advanced in a forward direction from lower deck 17 by drive cylinders 33 to commence mining. Generally, because the force of gravity pulls the miner 34 and conveyor car(s) 12 in an advance direction with launch deck 18 in the tilted position, it is to be understood that the drive cylinders 33 may actually operate to hold back the conveyor train in a controlled manner, rather than positively push the conveyor train in the advance direction. Because the stroke of typical drive cylinders 33 (in some embodiments, about eight feet) may be shorter than the length of a conveyor car 12 (in some embodiments, about twenty-four feet), the drive cylinders 33 may need to be disengaged from the conveyor cars, re-positioned, and then re-engaged with the conveyor cars for an additional stroke one or more times in order to effect the addition of a single conveyor car 12. Cables or chains 30 may serve to hold back the conveyor train when the drive cylinders 33 are thus disengaged and launch deck 18 is in the tilted orientation. There may be a need for holding back the conveyor car train with other conveyor car control systems listed in Table 4, namely, with "Strand Jacks with Single Strand," "Strand Jacks with Multiple Strands," and "Push/Pull Carriage on Launch with Hydraulic Driven Cable Loop," as well. Hold back mechanisms other than chains or cables 30, 31 may be utilized within the scope of the invention. For example, in a steep dip of about 5 degrees to about 15 degrees (as opposed to an ultra-steep dip of greater than 15 degrees), a block may be placed in front of the wheels of one or more conveyor cars 12 in order to prevent the train from further advancing into seam 14. With the conveyor train thus placed in the desired position along seam 14, the conveyor car(s) 12, conveyor belts 20, 21, and feed chute 27 may be operated to convey the mined material out of seam 14.

In one embodiment, the conveyor car drive cylinders 33 may each include two hold back bars, with at least one of the two hold back bars always being engaged to a conveyor car 12 at all times. Thus, one of the two hold back bars may be disengaged from the conveyor car 12 during the re-positioning of the drive cylinder, while the other hold back bar remains engaged with the conveyor car 12 to prevent the train from rolling into seam 14 in an uncontrolled manner.

After miner 34 has advanced far enough that another conveyor car 12 can be added, deck lift assembly 22 may be operated in an opposite direction to reverse the pivoting of launch deck 18 and return launch deck 18 to a substantially horizontal orientation. A front end loader (not shown) may then place another conveyor car 12 on launch deck 18. During this time, the previously rearmost conveyor car 12 is supported over the gap 50 by chains 30. The newly added conveyor car 12 may be electrically and mechanically connected to the previously rearmost conveyor car 12 by a cable and connector (not shown). With the newly added conveyor car 12 securely connected and operational, deck lift assembly 22 may be operated to pivot launch deck 18 to the desired dip angle 24, as illustrated in FIG. 1A. In other embodiments, the launch deck 18 is pivoted prior to electrically and mechanically connecting the newly added conveyor car to the previously rearmost conveyor car.

The above-described process may be repeated many times until the seam's maximum depth has been reached. The conveyor train may then be pulled out of seam 14 one conveyor car 12 at a time by employing the above-described process in reverse. For example, each conveyor car 12 may be sequentially pulled back by use of the drive cylinders 33, electrically disconnected, and then removed from a horizontally-oriented launch deck 18 by a front end loader. This unloading procedure may be repeated until miner 34 has been removed from seam 14, at which point the entire launch vehicle 16 may be hydraulically slid in a lateral direction on skids to a new location at which mining of the next seam may begin. Alternatively, this unloading procedure may be repeated until only a portion of the conveyor train has been removed, for example, to replace a damaged or inoperable conveyor car 12 in the middle of the conveyor train. Furthermore, the latter portion of a conveyor train may be remotely disconnected, mechanically and electrically, from the remaining portion of the conveyor train. The unloading procedure could then be used to remove the latter portion of the train, then subsequently remove the remaining portion of the conveyor train. By pulling the conveyor train out of the seam 14 in portions, the launch vehicle 16 need not pull the weight of the entire conveyor train.

Various aspects of different embodiments of the present invention are expressed in paragraphs X1, X2 and X3, as follows:

X1. One aspect of the present invention pertains to a launch vehicle for a highwall mining system particularly suitable for steep dip seams including modular conveyor cars that are connected together to form a conveyor train, comprising a lower deck, a substantially horizontally oriented upper deck disposed above the lower deck, a launch deck for receiving and supporting a rearmost conveyor car of the conveyor train, wherein the launch deck is pivotally attached to the upper deck, a deck lift assembly configured to effect controlled lifting and lowering of the launch deck to tilt the launch deck in a vertical plane relative to the upper deck, and to return the launch deck to a substantially horizontal orientation, wherein the upper deck remains substantially horizontally oriented during the tilting of the launch deck by the deck lift assembly.

X2. Another aspect of the present invention pertains to a method of highwall mining a steep dip seam, comprising the steps of providing an elongated launch vehicle having a lower deck, an upper deck disposed above the lower deck, a launch deck pivotally attached to the upper deck, a first conveyor belt carried on the lower deck and a second conveyor belt carried on the launch deck, aligning the launch vehicle with a planned location of a seam to be mined, advancing a miner and a conveyor train including at least one conveyor car into the seam at a dip angle, placing an additional conveyor car on the launch deck while the launch deck is in a substantially horizontal orientation, tilting the launch deck in a vertical plane relative to the upper deck to substantially match the dip angle, and attaching the additional conveyor car to the conveyor train.

X3. A further aspect of the present invention pertains to a highwall mining system particularly suitable for steep dip seams and of the type wherein multiple conveyor cars are connected together to form a conveyor train which extends into a seam being mined, comprising an elongated launch vehicle including a lower deck including an electric power control cab configured to control power to and operation of the highwall mining system, a substantially horizontally oriented upper deck supported above the lower deck by at least one support column, a launch deck for receiving and supporting a conveyor car which is to be added to or removed from an outer end of the conveyor train when in mining operation, wherein the launch deck is supported above the lower deck and pivotally coupled to the upper deck, a first conveyor belt supported by the lower deck, a second conveyor belt supported by the launch deck that extends substantially parallel to the launch deck, the second conveyor belt configured to move mined material to the first conveyor belt, and a deck lift assembly including at least one extendable elongated hydraulic cylinder secured to the launch deck at one end and secured to the upper deck at an opposite end, the hydraulic cylinder configured to effect controlled lifting and lowering of the launch deck and to tilt the launch deck in a vertical plane relative to the upper deck as desired to substantially match a dip angle of the seam to be mined during mining operation, and to return the launch deck to a substantially horizontal orientation when not in mining operation, a plurality of conveyor cars forming the conveyor train and adapted to convey mined material outwardly to the second conveyor belt, and a miner attached to an inner end of the conveyor train for cutting material from the seam being mined and moving the material to the inner end of the conveyor train for conveyance by the conveyor train outwardly to the second conveyor belt.

Yet other embodiments pertain to any of the previous statements X1, X2 or X3 which are combined with one or more of the following other aspects.

Wherein the launch vehicle further comprises a first conveyor belt carried on the lower deck and a second conveyor belt carried on the launch deck, the second conveyor belt configured to transfer mined material to the first conveyor belt.

Wherein the first conveyor belt remains fixed in position and the second conveyor belt remains substantially parallel to the launch deck during the tilting of the launch deck by the deck lift assembly.

Wherein the upper deck is substantially fixed in a horizontal orientation during operation.

At least one conveyor car drive cylinder mounted to the launch deck and remaining in parallel relation thereto and to a rearmost conveyor car when supported on the launch deck throughout all tilt angles of the launch deck, the conveyor car drive cylinder including a ram having an activatable conveyor car engaging device thereon such that actuation of the conveyor car drive cylinder in conjunction with the engaging device causes the conveyor cars to be selectively advanced into the seam or retracted therefrom.

A windlass attached to the launch deck, the windlass being configured to releasably couple to the conveyor train to prevent the conveyor train from advancing into the seam when the conveyor car drive cylinder is disengaged from the rearmost conveyor car.

At least one cable or chain releasably coupled to the conveyor train, the cable or chain being configured to prevent the conveyor train from advancing into the seam when the conveyor car drive cylinder is disengaged from the rearmost conveyor car.

Wherein the at least one cable or chain comprises two cables or two chains, each cable or chain being attached to a respective side of the rearmost conveyor car.

Wherein the conveyor car drive cylinder is configured to prevent the conveyor train from advancing into the seam when the conveyor car drive cylinder is engaged with the last of the conveyor cars.

A ramp coupled to a first end of the lower deck, the ramp being configured to support the conveyor train between the first end of the lower deck and the seam.

A gap between the launch deck and the ramp.

Wherein the conveyor car includes frontmost wheels and rearmost wheels, and wherein the gap is longer than the distance between the frontmost wheels and the rearmost wheels.

Wherein the launch deck is tiltable at an angle of up to about thirty degrees relative to a horizontal direction.

Wherein the launch deck is tiltable at an angle approximately equal to a dip angle of the seam.

Wherein the dip angle is greater than or equal to 15 degrees.

Wherein the dip angle is at least 15 degrees.

Wherein the lower deck includes an electric power control cab configured to control power to and operation of the launch vehicle.

Wherein the deck lift assembly is at least one extendible hydraulic cylinder secured to the launch deck at one end of the hydraulic cylinder and secured to the upper deck at an opposite end of the hydraulic cylinder.

Wherein the tilting includes pivoting a rear end of the launch deck upward, the pivoting being about a pivot point located between a midpoint of the launch deck and a front end of the launch deck.

Wherein the method comprises the further steps of tilting the launch deck in a vertical plane relative to the upper deck until the launch deck returns to the substantially horizontal orientation, placing a subsequent conveyor car on the launch deck while the launch deck is in the substantially horizontal orientation, and again tilting the launch deck in the vertical plane relative to the upper deck to substantially match the dip angle.

Wherein the upper deck is substantially fixed in a substantially horizontal orientation.

Wherein the upper deck remains substantially horizontally oriented during the tilting of the launch deck by the deck lift assembly.

Wherein the upper deck is supported by a plurality of support columns.

Wherein the upper deck is supported by front and rear extendable support columns.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A launch vehicle for a highwall mining system, comprising:
    a horizontally oriented lower deck;
    a launch deck disposed above the lower deck;
    a deck lift assembly configured to effect controlled lifting and lowering of the launch deck;
    a first conveyor belt carried on the lower deck; and
    a second conveyor belt carried on the launch deck, the second conveyor belt configured to transfer mined material to the first conveyor belt;
    wherein the lower deck remains horizontally oriented during tilting of the launch deck by the deck lift assembly.

2. The launch vehicle of claim 1, wherein the first conveyor belt remains fixed in position and the second conveyor belt remains parallel to the launch deck during the tilting of the launch deck by the deck lift assembly.

3. The launch vehicle of claim 1, further comprising a feed chute configured to receive mined material from the second conveyor belt and direct the mined material to the first conveyor belt.

4. The launch vehicle of claim 1, further comprising a horizontally oriented upper deck disposed above the lower deck, wherein the launch deck is pivotally attached to the upper deck, and wherein the deck lift assembly is configured to effect controlled lifting and lowering of the launch deck to tilt the launch deck relative to the upper deck, and to return the launch deck to a horizontal orientation.

5. The launch vehicle of claim 4, wherein the upper deck remains horizontally oriented during the tilting of the launch deck by the deck lift assembly.

6. The launch vehicle of claim 4, wherein the deck lift assembly is at least one extendible hydraulic cylinder secured to the launch deck at one end of the hydraulic cylinder and secured to the upper deck at an opposite end of the hydraulic cylinder.

7. The launch vehicle of claim 1, further comprising a conveyor car control system mounted to the launch deck and remaining in parallel relation thereto throughout all tilt angles of the launch deck.

8. The launch vehicle of claim 7, wherein the conveyor car control system includes at least one conveyor car drive cylinder such that actuation of the conveyor car drive cylinder causes a conveyor car to be selectively advanced into a seam or retracted therefrom.

9. The launch vehicle of claim 8, further comprising a windlass configured to releasably couple to a conveyor train to prevent the conveyor train from advancing into the seam when the conveyor car drive cylinder is disengaged from a rearmost conveyor car in the conveyor train.

10. The launch vehicle of claim 8, further comprising at least one chain releasably coupled to a conveyor train, the chain being configured to prevent the conveyor train from advancing into the seam when the conveyor car drive cylinder is disengaged from a rearmost conveyor car in the conveyor train.

11. The launch vehicle of claim 10, wherein the at least one chain comprises two chains, each cable or chain being attached to a respective side of the conveyor car.

12. The launch vehicle of claim 8, wherein the conveyor car drive cylinder is configured to prevent the conveyor car from advancing into the seam when the conveyor car drive cylinder is engaged with the conveyor car.

13. The launch vehicle of claim 1, further comprising a ramp coupled to the lower deck, the ramp being configured to support a conveyor train between the lower deck and a seam.

14. The launch vehicle of claim 1, wherein the launch deck is tiltable at a dip angle of up to thirty degrees relative to a horizontal direction.

15. The launch vehicle of claim 14, wherein the dip angle is at least 15 degrees.

16. The launch vehicle of claim 1, wherein the lower deck includes an electric power control cabin configured to control power to and operation of the launch vehicle.

17. A launch vehicle for a highwall mining system, comprising:
    a horizontally oriented lower deck;
    a launch deck disposed above the lower deck;
    a deck lift assembly configured to effect controlled lifting and lowering of the launch deck;
    a gap between the launch deck and the lower deck, wherein the gap is longer than the distance between frontmost and rearmost wheels of a conveyor car
    wherein the lower deck remains horizontally oriented during tilting of the launch deck by the deck lift assembly.

18. The launch vehicle of claim 17, wherein the conveyor car is supported within the gap at an angle equal to an entry angle of a seam.

19. A method of highwall mining a steep dip seam, comprising the steps of:
    providing an elongated launch vehicle having a lower deck, a launch deck disposed above the lower deck, a first conveyor belt carried on the lower deck and a second conveyor belt carried on the launch deck;
    aligning the launch vehicle with a planned location of a seam to be mined;
    placing a conveyor car on the launch deck while the launch deck is in a horizontal orientation;
    tilting the launch deck upward relative to the lower deck to match an entry angle of the seam;

connecting the conveyor car to a conveyor train extending into the seam, the conveyor train including a miner and at least one train conveyor car, the conveyor car thereby becoming a rearmost conveyor car in the conveyor train;

using the miner to cut material from the seam being mined;

moving the cut material to the rearmost conveyor car by use of the conveyor train;

moving the cut material to the second conveyor belt by use of the rearmost conveyor car; and moving the cut material to the first conveyor belt by use of the second conveyor belt.

20. The method of claim 19, comprising the further steps of:

placing the miner and the at least one train conveyor car on the lower deck; and advancing the miner and the at least one conveyor car into the seam at the entry angle;

wherein the steps of placing the miner and at least one train conveyor car on the lower deck and advancing the miner and the at least one train conveyor car into the seam at the entry angle occur prior to the step of placing the conveyor car on the launch deck while the launch deck is in the horizontal orientation.

21. The method of claim 19, wherein the tilting includes pivoting a rear end of the launch deck upward.

22. The method of claim 19, comprising the further steps of:

tilting the launch deck until the launch deck returns to the horizontal orientation;

placing an additional conveyor car on the launch deck while the launch deck is in the horizontal orientation; and again tilting the launch deck upward relative to the upper deck to match the entry angle of the seam.

23. The method of claim 19, wherein the launch deck is fixed in a substantially horizontal orientation.

24. A highwall mining system particularly suitable for steep dip seams and of the type wherein multiple conveyor cars are connected together to form a conveyor train which extends into a seam being mined, comprising:

an elongated launch vehicle including:

a horizontally oriented lower deck including an electric power control cab configured to control power to and operation of the highwall mining system, a horizontally oriented upper deck supported above the lower deck by at least one support column, a launch deck for receiving and supporting a conveyor car which is to be added to or removed from an outer end of the conveyor train when in mining operation, wherein the launch deck is supported above the lower deck and pivotally coupled to the upper deck, a first conveyor belt supported by the lower deck, a second conveyor belt supported by the launch deck that extends parallel to the launch deck, the second conveyor belt configured to move mined material to the first conveyor belt, and a deck lift assembly including at least one extendable elongated hydraulic cylinder secured to the launch deck at one end and secured to the upper deck at an opposite end, the hydraulic cylinder configured to effect controlled lifting and lowering of the launch deck and to tilt the launch deck upward relative to the upper deck as desired to match a dip angle of the seam to be mined during mining operation, and to return the launch deck to a horizontal orientation when not in mining operation;

a plurality of conveyor cars forming the conveyor train and adapted to convey mined material outwardly to the second conveyor belt; and a miner attached to an inner end of the conveyor train for cutting material from the seam being mined and moving the material to the inner end of the conveyor train for conveyance by the conveyor train outwardly to the second conveyor belt.

25. The system of claim 24, further comprising at least one elongated hydraulic conveyor car drive cylinder mounted to the launch deck and remaining in parallel relation thereto throughout all tilt angles of the launch deck such that actuation of the drive causes the conveyor train to be selectively advanced into the seam or retracted therefrom.

26. The system of claim 24, wherein the upper deck remains horizontally oriented during the tilting of the launch deck by the deck lift assembly.

* * * * *

UNITED STATES PATENT AND TRADEMARK OFFICE
CERTIFICATE OF CORRECTION

| | | |
|---|---|---|
| PATENT NO. | : 9,731,903 B2 | Page 1 of 1 |
| APPLICATION NO. | : 14/872324 | |
| DATED | : August 15, 2017 | |
| INVENTOR(S) | : Paul Hartcher | |

It is certified that error appears in the above-identified patent and that said Letters Patent is hereby corrected as shown below:

In the Claims

Column 18, Line 38, "drive" should be changed to --drive cylinder--

Signed and Sealed this
Third Day of October, 2017

Joseph Matal
*Performing the Functions and Duties of the*
*Under Secretary of Commerce for Intellectual Property and*
*Director of the United States Patent and Trademark Office*